(12) United States Patent
Locker et al.

(10) Patent No.: US 12,646,358 B2
(45) Date of Patent: Jun. 2, 2026

(54) EXTRANEOUS VIDEO ELEMENT DETECTION AND MODIFICATION

(71) Applicant: Lenovo (United States) Inc., Morrisville, NC (US)

(72) Inventors: Howard J. Locker, Cary, NC (US); John Weldon Nicholson, Cary, NC (US); Daryl C Cromer, Raleigh, NC (US); David Alexander Schwarz, Morrisville, NC (US); Mounika Vanka, Durham, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 832 days.

(21) Appl. No.: 17/543,579

(22) Filed: Dec. 6, 2021

(65) Prior Publication Data

US 2023/0177884 A1 Jun. 8, 2023

(51) Int. Cl.
| | |
|---|---|
| *G06V 40/20* | (2022.01) |
| *G06F 3/01* | (2006.01) |
| *G06N 20/00* | (2019.01) |
| *G06V 20/40* | (2022.01) |
| *G06V 40/16* | (2022.01) |
| *G10L 15/18* | (2013.01) |
| *G10L 15/24* | (2013.01) |

(52) U.S. Cl.
CPC .............. *G06V 40/28* (2022.01); *G06F 3/013* (2013.01); *G06N 20/00* (2019.01); *G06V 20/46* (2022.01); *G06V 40/176* (2022.01); *G10L 15/18* (2013.01); *G10L 15/24* (2013.01)

(58) Field of Classification Search
CPC ........ G06V 10/82; G06V 20/46; G06V 40/18;
G06V 40/176; G06V 40/28; G06V 40/174; G06N 3/09; G06N 3/0455; G06N 3/0464; G06N 3/094; G06N 3/084; G06N 3/092; G06N 20/00; G10L 15/24; G10L 15/26; G10L 15/18; G06F 3/013; H04N 7/147

See application file for complete search history.

(56) References Cited

U.S. PATENT DOCUMENTS

| | | | | |
|---|---|---|---|---|
| 7,564,476 | B1 * | 7/2009 | Coughlan | .............. H04N 7/147 |
| | | | | 348/14.08 |
| 9,888,211 | B1 * | 2/2018 | Browne | .............. H04L 65/1083 |
| 2012/0327176 | A1 * | 12/2012 | Kee | .......................... H04N 7/15 |
| | | | | 348/E7.083 |

(Continued)

FOREIGN PATENT DOCUMENTS

| | | | | |
|---|---|---|---|---|
| WO | WO-2022191848 A1 * | 9/2022 | ............. | H04N 7/147 |

OTHER PUBLICATIONS

Crowley, J. L., Coutaz, J., and Berard, F. Things that see. Communications of the ACM, 43(3), 54-64, 2000. (Year: 2000).*

*Primary Examiner* — Tracy Mangialaschi
(74) *Attorney, Agent, or Firm* — Schwegman Lundberg & Woessner, P.A.

(57) ABSTRACT

A computer implemented method includes receiving images from a device camera during a video conference and processing the received images via a machine learning model trained on labeled image training data to detect extraneous image portions. Extraneous image pixels associated with the extraneous image portions are identified and replaced with replacement image pixels from previously stored image pixels to form modified images. The modified images may be transmitted during the video conference.

20 Claims, 5 Drawing Sheets

(56)                    References Cited

U.S. PATENT DOCUMENTS

| | | | |
|---|---|---|---|
| 2015/0030314 A1* | 1/2015 | Skarakis | G06V 20/49 |
| | | | 386/278 |
| 2022/0060525 A1* | 2/2022 | Chavez | G06F 3/165 |
| 2022/0141396 A1* | 5/2022 | Ruan | H04M 3/567 |
| | | | 348/239 |
| 2024/0121358 A1* | 4/2024 | Wang | G06T 7/20 |

* cited by examiner

300
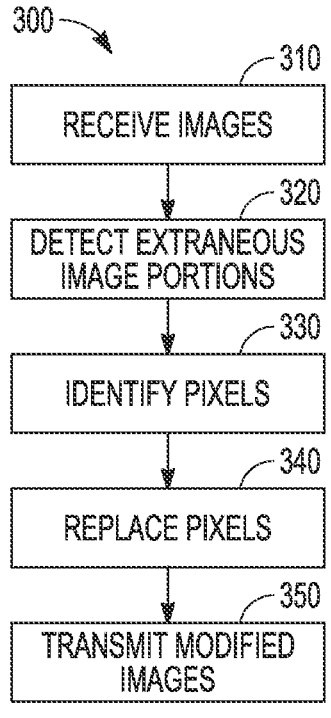
310
RECEIVE IMAGES
320
DETECT EXTRANEOUS IMAGE PORTIONS
330
IDENTIFY PIXELS
340
REPLACE PIXELS
350
TRANSMIT MODIFIED IMAGES
FIG. 3
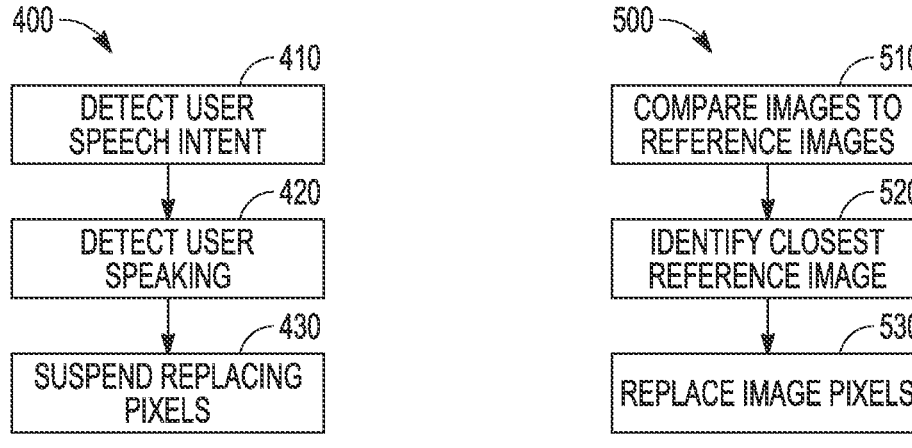
400
410
DETECT USER SPEECH INTENT
420
DETECT USER SPEAKING
430
SUSPEND REPLACING PIXELS
FIG. 4
500
510
COMPARE IMAGES TO REFERENCE IMAGES
520
IDENTIFY CLOSEST REFERENCE IMAGE
530
REPLACE IMAGE PIXELS
FIG. 5

EXTRANEOUS VIDEO ELEMENT DETECTION AND MODIFICATION

BACKGROUND

Video conferencing boosts productivity, saves time, and promotes collaboration. The use of video during a video conference also facilitates communication by allowing participants to view the body language and facial expressions of other participants and team members. One drawback of a video call may include the video transmission of actions that the participant would rather not share with other participants. Example actions may include eating or drinking.

During a video call, the user has the option to stop the video feed. Alternatively, a "camera privacy mode" may be used to cover up a camera with a physical shutter (black screen) or replace the camera image with another still image or privacy image. However, these techniques cause a temporary interruption to the meeting and to the participants and may be more disruptive than the distraction. Existing solutions also require the user to take a conscious and physical action.

SUMMARY

A computer implemented method includes receiving images from a device camera during a video conference and processing the received images via a machine learning model trained on labeled image training data to detect extraneous image portions. Extraneous image pixels associated with the extraneous image portions are identified and replaced with replacement image pixels from previously stored image pixels to form modified images. The modified images may be transmitted during the video conference.

BRIEF DESCRIPTION OF THE DRAWINGS

FIG. 3 is flowchart of a computer implemented method for modifying portions of video images during a video conference according to an example embodiment.

FIG. 4 is flowchart of a computer implemented method for controlling whether or not to replace image pixels based on a user speaking according to an example embodiment.

FIG. 5 is flowchart of a computer implemented method for identifying pixels from reference images to use for modifying images according to an example embodiment.

DETAILED DESCRIPTION

Figure 1:
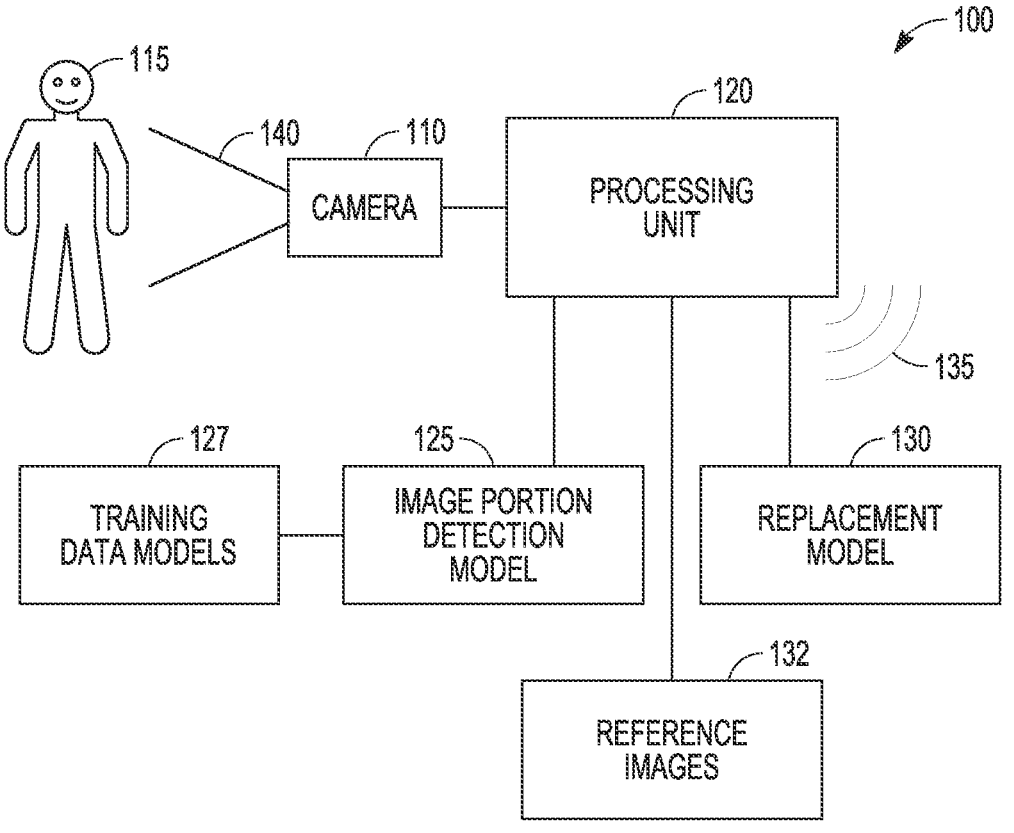
FIG. 1 is a block diagram of a system 100 for detecting extraneous image portions during a video conference call according to an example embodiment.

In the following description, reference is made to the accompanying drawings that form a part hereof, and in which is shown by ways of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, smart phone, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Extraneous user motions and extraneous objects in a video stream from a user device can be distracting to other users on a video conference call. A system uses one or more trained machine learning models to detect extraneous video image portions and replace such portions with portions of images previously captured. The replacing of portions may be performed without the need for the user to take any affirmative action. Extraneous image portions may include one or more of unnecessary arm motion, reaching, arm waving, stretching, the user looking away, and the addition of objects (cup, food etc.) within the field of view of the video frame.

During the video conference call, video images are captured and added to a reference data set of reference images. The reference images that do not include disruptive or distracting movement are included in the reference data set. In some examples, the reference images do not include images that include objects such as water bottles, drinking cups, lunch related objects, and other objects. If a user takes glasses on and off during a call, the reference dataset may include images that include the user wearing and not wearing the glasses.

The reference images may continue to get updated during the entire length of the video call as all frames that don't have disruptive or distracting movement or presence of other objects are added. Therefore, it includes a variety of eye/ head motion, body language, and facial expressions.

In one example, the extraneous video image portions have corresponding sets of pixels that represent unnecessary motion or objects that are replaced with pixels from the reference video dataset thereby presenting a modified video feed without motion or objects. One or more trained neural network models, such as encoder/decoder network models, compare a real time video feed from a user system camera against the reference video dataset and pick a frame that is closest to the real time video feed without the distracting additions. The closest frame may be one with similar eye, head, facial movement. Since the reference video is collected over a period of time, it is likely that very close replacement pixels will be found to enable a realistic modified video feed with accurate eye, head, and facial movement. The modified video feed can even lag by a number of frames (will get smaller as neural networks continue to improve) that is required to analyze the actual video feed and create the modified video feed.

In some examples, the system may detect whether or not the user is speaking. Such detection may be done by detecting speech from a user system microphone, or by observing that the user system is on mute during the video conference call. Replacement may be stopped while the user is speaking, as user movements may be representative of the speech and are not deemed to be extraneous.

Natural language understanding models may be used to determine whether or not the user is being addressed by other users on the call, which is indicative that the user may soon speak or is being watched. Such a determination may be used to alert the user that replacement, if in effect, will be stopped shortly, allowing the user to discontinue distracting or extraneous activity.

In one example, the natural language understanding model may be trained to recognize the name of the user of the device from received audio on the conference call. The natural language model may also be trained to recognize a question or request. By combining the recognition of the name of the user with the recognition of a question, it can be recognized that the user is being addressed and likely to need to respond. Upon such recognition, the user can be alerted to discontinue any activity that might result in extraneous image portions, such as eating, drinking, or any other activity the user might not desire to be shared. The user may then stop the activity, which may stop the replacement, allowing the user to respond and be seen visually while responding. The alert may include a selectable option to stop the replacement and unmute if muted. The alert may be visual and may include an audio tone or other indicator.

In some examples, a modified video feed may replace a user that appears bored or non-interested, such as a user looking away from screen or yawning. The modified video feed may appear with a user laser focused body language and facial expressions.

The trend for wider field-of-view cameras having a wider field of view than a field of view of the corresponding transmitted video may also be used. Wider field of view images may enable automatic following and may also be used to predict that extraneous objects are about to enter the transmitted field of view. The system may be a user system with a camera or a conference room system with one or more room cameras that may capture a wide field of view. Machine learning models may reside locally or be cloud based for processing the video images.

In one example, the user may trigger the use of replacement images. For example, a video "cough button" or "sneeze button" may be selected by the user in anticipation of a cough or sneeze or other motion the user desires to have replaced. A resume button may be selected to blend, morph, or simply resume back to live video.

FIG. 1 is a block diagram of a system 100 for detecting extraneous image portions during a video conference call. System 100 utilizes images from a camera 110 of a user 115 during the video conference call. The images are video images that are received by a processing unit 120. The processing unit may execute or process one or more models, such as model 125, for detecting extraneous image portions. The model 125 may be trained on training data images that 127 are labeled with indications of extraneous movement or objects to enable the model to quickly identify portions of images that contain similar extraneous movement. Such extraneous movement may be identified by motion detection using MPEG processing techniques. The models may provide a confidence value that may be compared to a threshold value to expressly identify the portions of images that are extraneous and should be modified or replaced.

The portions of images that are so identified may be processed via a replacement model 130 to compare the images to reference images 132 to find reference images that are close in content. Pixels from the reference images 132 are then used to replace pixels of such portions prior to transmission of modified images as indicated at network connection 135, which may be a wired or wireless connection. In one example, model 130 comprises an autoencoder which encodes images and replace portions of the images with portions of images from the reference image. A generative adversarial network (GAN) may be used in another example.

Figure 2:
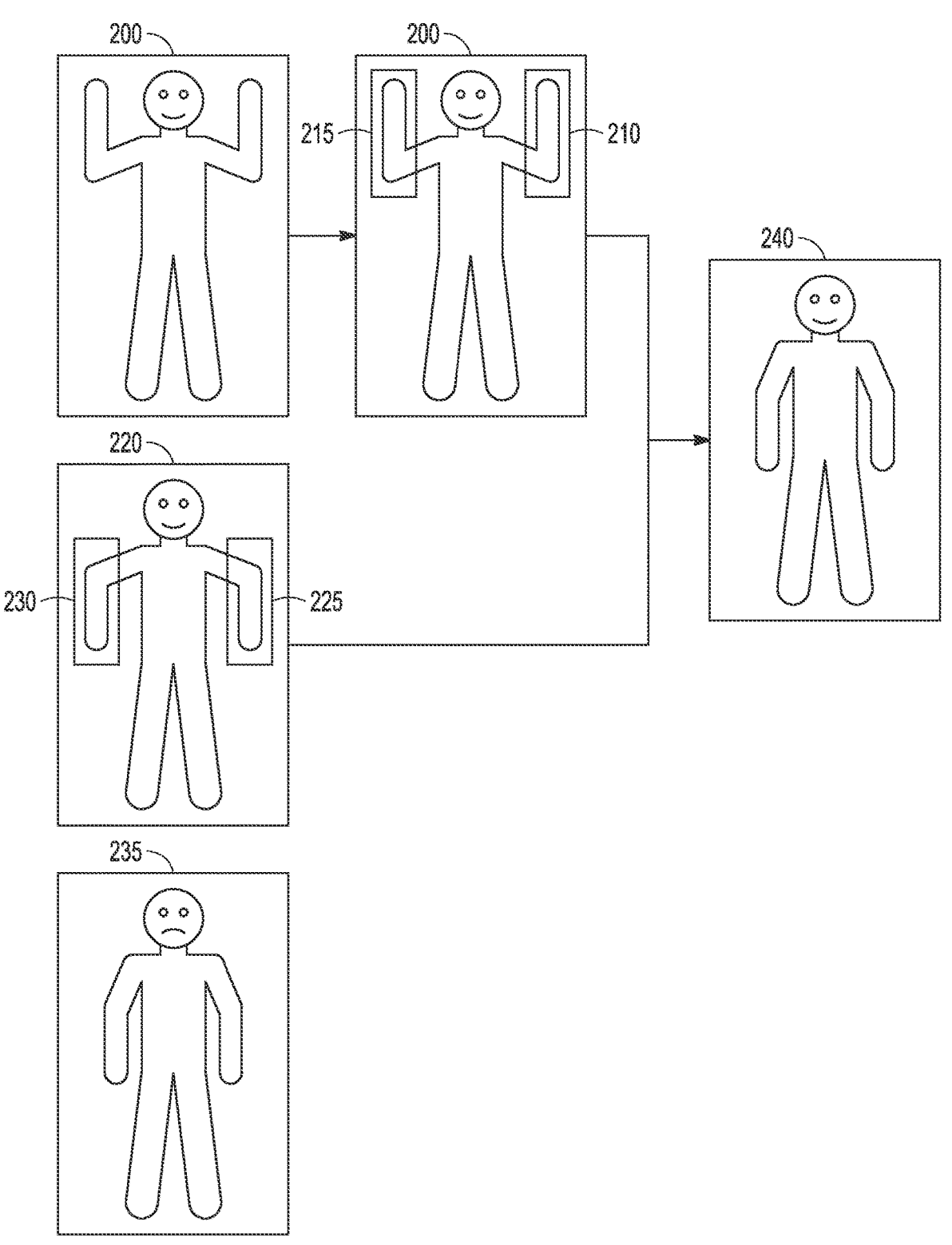
FIG. 2 is a block diagram illustrating processing of an image according to an example embodiment.

FIG. 2 is a block diagram illustrating processing of an image 200 according to an example embodiment. Image 200 is first processed by model 125 to identify portions represented by bounding boxes 210 and 215 of the image 200 that include extraneous motion. The extraneous motion is illustrated as a raising of the arms. While both arms are shown as raised, one arm may be raised or waved in further examples resulting in only one bounding box being identified. The bounding boxes are represented as rectangles but may be polygons of any shape in further examples to cut down on the number of pixels needing replacement.

Replacement model 130 is then used to obtain reference images 132, shown as images 230 and 235. Image 230 is selected as closest to image 200. Replacement pixels are obtained and are illustrated in bounding boxes 225 and 230. These replacement pixels are then used to modify image 200 by substituting the replacement pixels for the pixels in bounding boxes 210 and 215 to obtain modified image 240.

In one example, the images may comprise a sequence of images, such as a video clip.

FIG. 3 is flowchart of a computer implemented method 300 for modifying portions of video images during a video conference. Method 300 begins at operation 310 by receiving images from a device camera during a video conference. At operation 320, the received images are processed via a machine learning model trained on labeled image training data to detect extraneous image portions.

The machine learning model may be trained on one or more of types of video images labeled as including extraneous image portions comprising unnecessary arm motion of a user, video images labeled as including extraneous image portions comprising eating activities of a user, video images labeled as including extraneous image portions comprising a changed direction of gaze of a user, and video images labeled as including the addition of objects associated with extraneous user movements.

The labeled image training data may be labeled by humans in one example. In some examples, separate machine learning models may be used for different types of extraneous image portions.

Extraneous image pixels associated with the extraneous image portions are identified at operation 330. The extraneous image pixels are replaced at operation 340 with replacement image pixels from previously stored image pixels to form modified images. The modified images are transmitted to other devices on the video conference at operation 350.

The previously stored image pixels may include reference images without extraneous motion captured during the conference call. In some examples, the previously stored image pixels may also, or alternatively, comprise reference images without extraneous motion captured prior to the conference call. The received images and labeled image training data may have a field of view wider than the transmitted modified images.

FIG. 4 is flowchart of a computer implemented method 400 for controlling whether or not to replace image pixels based on a user speaking. Method 400 begins at operation 410 by detecting whether or not the user intends user speech to be transmitted. This may be done by either detecting that a user device is in a mute state or receiving audio signals from the device and processing the audio signals to detect that a user is speaking at operation 420. At operation 430, replacing of the extraneous image pixels is suspended in response to detecting that the user is speaking or that the user device is in a mute state.

FIG. 5 is flowchart of a computer implemented method 500 for identifying pixels from reference images to use for modifying images. Method 500 begins at operation 510 by comparing the received images having extraneous user movements to the reference images. At operation 520, for each received image, a closest reference image is identified. At operation 530, replacement image pixels from such closest reference images are identified.

In a further example, a user-initiated replacement signal may be received to trigger replacing all the image pixels with replacement image pixels until a stop replacement signal is received. Such a user-initiated replacement signal may be provided when the user feels a sneeze or cough coming on, or just wants a bit of privacy for any other reason.

In one example, the previously stored image pixels comprise reference images and further comprising suspending replacing the extraneous image pixels with replacement image pixels by transitioning between the reference video and the live video. Transitioning is performed using a generator network such as a GAN to transition from reference images in the video back to received images from the camera, also referred to as live images.

Figure 6:
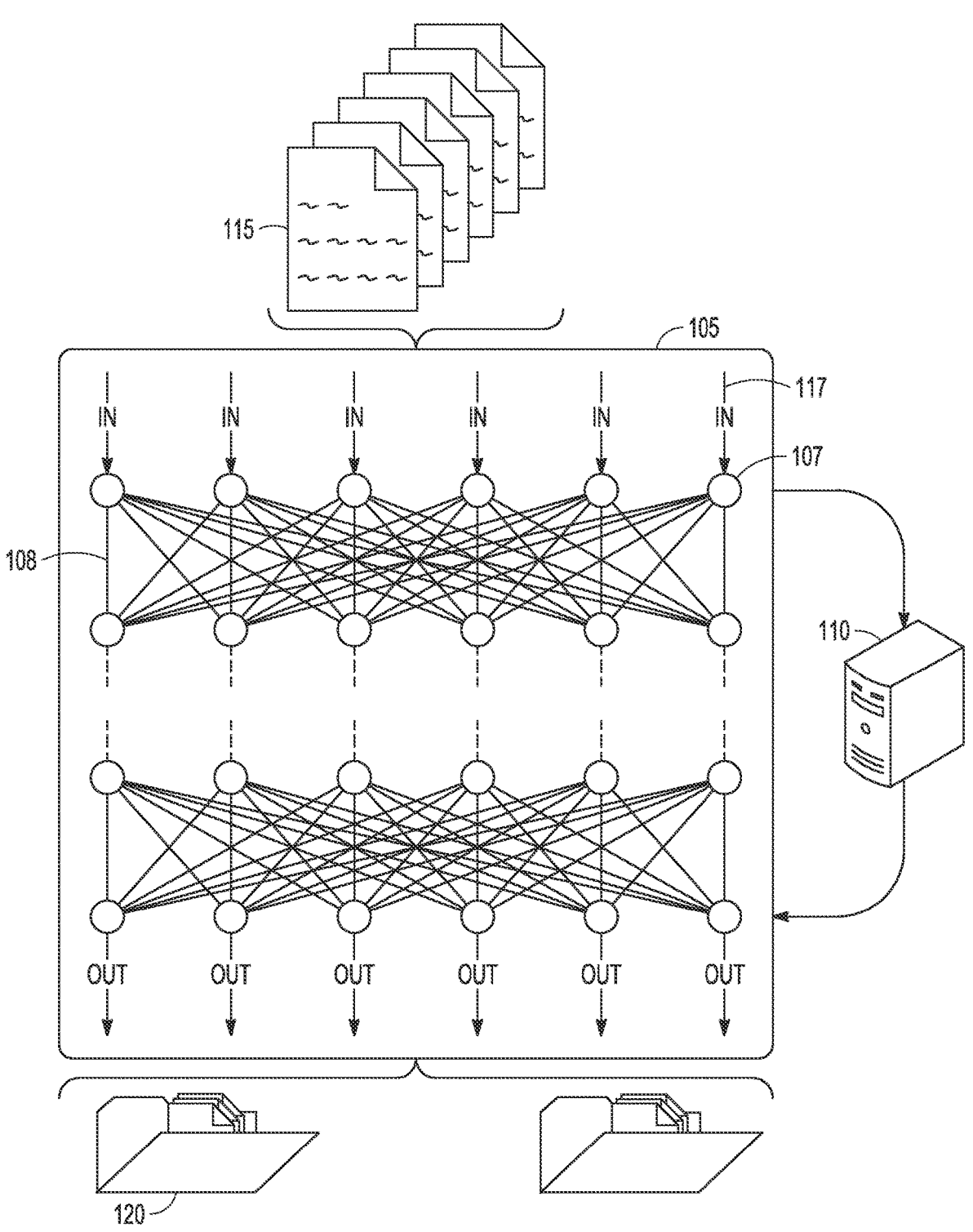
FIG. 6 is a block diagram of an example of an environment including a system for neural network training according to an example embodiment.

The system 100 utilizes one or more artificial intelligence (AI) modules to both detect extraneous image portions and replace image pixels. FIG. 6 provides some information regarding neural networks to aid in understanding operation of various embodiments. FIG. 6 provides a view of how such modules are trained with images containing extraneous motions and objects.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well known optimization algorithm for back propagation may be used, such as SGD, Adam, etc.

FIG. 6 is a block diagram of an example of an environment including a system for neural network training, according to an embodiment. The system includes an ANN 605 that is trained using a processing node 610. ANN 605 may be implemented as a module and used in conjunction with the combined reward functions. Example modules include convolutional neural networks (CNN) and other types of networks such as ResNet, a type of network that uses residual functions, as well as any other type of network that may be adapted to utilize reward functions. Such neural networks may consist of one or more layers of neurons or synapses in various embodiments. The number of layers may depend on the type of network selected. ResNet may have 50 layers, for example, while other networks may have from a few to a thousand or more. Other CNN structures that may be used include but are not limited to VGG, Inception, and Exception.

The processing node 610 may be a CPU, GPU, field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training data set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training data set 615 is a subset of a complete training set. Here, the subset may enable processing nodes with limited storage resources to participate in training the ANN 605.

The training data may include multiple numerical values representative of a domain, such as red, green, and blue pixel values and intensity values for an image or pitch and volume values at discrete times for speech recognition. Each value of the training, or input 617 to be classified once ANN 605 is trained, is provided to a corresponding node 607 in the first layer or input layer of ANN 605. The values propagate through the layers and are changed by the objective function.

As noted above, the set of processing nodes is arranged to train the neural network to create a trained neural network. Once trained, data input into the ANN will produce valid classifications 620 (e.g., the input data 617 will be assigned into categories), for example. The training performed by the set of processing nodes 607 is iterative. In an example, each iteration of the training the neural network is performed independently between layers of the ANN 605. Thus, two distinct layers may be processed in parallel by different members of the set of processing nodes. In an example, different layers of the ANN 605 are trained on different hardware.

ANN 605 may calculate one or more neuron or synapse weights 608 for criteria based upon one or more machine learning algorithms. During training, historical action information representing past actions of the robot may be labeled with an indication of whether the decision made was ultimately successful, in this case, the reward. Thus, the reward, which is based on both robot navigation and the ability to track the object, is used to update the network weights 608. Note that in various networks, initial weights may be pre-set. In other networks, initial weights may be randomized. In one embodiment, a module or processor executing computer instructions to effectuate the neural network learning operations modifies a source neuron's output with a synapse weight to determine the contribution of the source neuron to cause the sink neuron to fire. Practically, in this embodiment, a single and modified value is integrated at the sink neuron in response to the source neuron activation.

Figure 7:
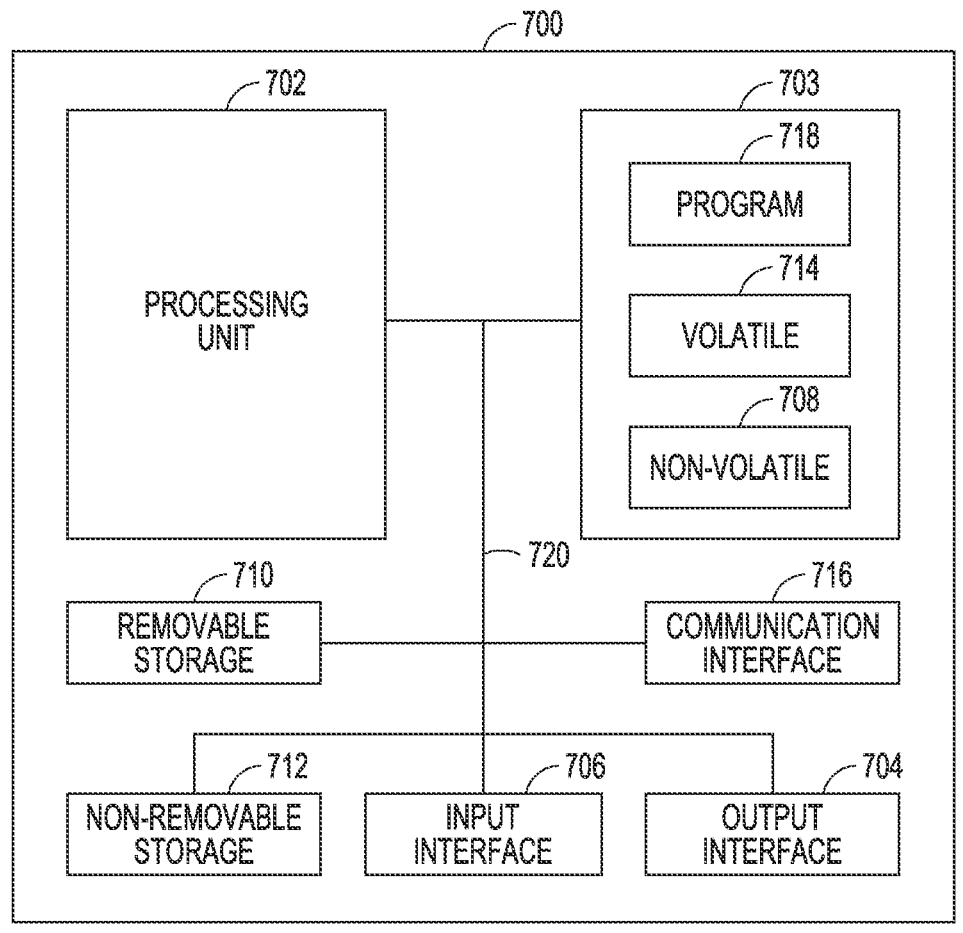
FIG. 7 is a block schematic diagram of a computer system to implement one or more example embodiments.

FIG. 7 is a block schematic diagram of a computer system 700 to modify video conference images based on extraneous portions of images being detected and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touch-screen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cel-lular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A computer implemented method includes receiving images from a device camera during a video conference, processing the received images via a machine learning model trained on labeled image training data to detect extraneous image portions, identifying extraneous image pixels associated with the extraneous image portions, and replacing the extraneous image pixels with replacement image pixels from previously stored image pixels to form modified images.

2. The method of example 1 and further including trans-mitting the modified images to other devices on the video conference.

3. The method of any of examples 1-2 wherein the received images and labeled image training data have a field of view wider than the modified images.

4. The method of any of examples 1-3 wherein the machine learning model is trained on video images labeled as including extraneous image portions comprising unnec-essary arm motion or eating activities of a user.

5. The method of any of examples 1-4 and further including receiving audio from the conference call, detect-ing that a user of the device is being addressed by processing the received audio via a natural language model trained to recognize a name of the user, and alerting the user to discontinue activity resulting in extraneous image portions.

6. The method of any of examples 1-5 wherein the machine learning model is trained on video images labeled as including extraneous image portions comprising a changed direction of gaze of a user.

7. The method of any of examples 1-6 and further including receiving audio signals from the device, process-ing the audio signals to detect that a user is speaking, and suspending replacing of the extraneous image pixels in response to detecting that the user is speaking.

8. The method of any of examples 1-7 and further including detecting that a user device has unmuted the device and suspending replacing of the extraneous image pixels in response to detecting that the user device is unmuted.

9. The method of any of examples 1-8 wherein the machine learning model is trained to detect the addition of objects in the received images.

10. The method of any of examples 1-9 wherein the previously stored image pixels include reference images without extraneous image pixels captured during the con-ference call.

11. The method of any of examples 1-10 wherein the previously stored image pixels include reference images without extraneous image pixels captured prior to the con-ference call.

12. The method of any of examples 1-11 wherein the previously stored image pixels include reference images and further including comparing the received images having extraneous image pixels to the reference images, identifying for each received image, a closest reference image, and identifying the replacement image pixels from such closest reference images.

13. The method of any of examples 1-12 and further including receiving a user-initiated replacement signal that triggers replacing the image pixels with replacement image pixels until a stop replacement signal is received.

14. The method of any of examples 1-13 wherein the previously stored image pixels include reference images and further comprising suspending replacing the extraneous image pixels with replacement image pixels by transitioning between the reference video and the live video.

15. The method of example 14 wherein transitioning is performed using a generator network.

16. A machine-readable storage device has instructions for execution by a processor of a machine to cause the processor to perform operations to perform any of the methods of examples 1-15.

17. A device including a processor and a memory device coupled to the processor and having a program stored thereon for execution by the processor to perform operations to perform any of the methods of examples 1-15.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other compo-nents may be added to, or removed from, the described systems. Other embodiments may be within the scope of the following claims.

The invention claimed is:

1. A computer implemented method comprising:
receiving images of a user from a device camera during a video conference;
processing the received images via a machine learning model trained on motion detection labeled video image training data to detect extraneous image portions cap-turing extraneous motions of the user;
identifying extraneous image pixels associated with the extraneous image portions capturing extraneous motions of the user; and replacing the extraneous image pixels with replacement image pixels of the user from previously stored image pixels that do not contain extraneous image portions to form modified images.

2. The method of claim 1 and further comprising transmitting the modified images to other devices on the video conference.

3. The method of claim 1 wherein the received images and labeled image training data have a field of view wider than the modified images.

4. The method of claim 1 wherein the machine learning model is trained on video images labeled as including extraneous image portions comprising unnecessary arm motion or eating activities of the user.

5. The method of claim 1 and further comprising:
receiving audio from the video conference;
detecting that the user of the device is being addressed by processing the received audio via a natural language model trained to recognize a name of the user; and
alerting the user to discontinue activity resulting in extraneous image portions.

6. The method of claim 1 wherein the machine learning model is trained on video images labeled as including extraneous image portions comprising a changed direction of gaze of the user.

7. The method of claim 1 and further comprising:
receiving audio signals from the device;
processing the audio signals to detect that the user is speaking; and
suspending replacing of the extraneous image pixels in response to detecting that the user is speaking.

8. The method of claim 1 and further comprising:
detecting that the user device has unmuted the device; and
suspending replacing of the extraneous image pixels in response to detecting that the user device is unmuted.

9. The method of claim 1 wherein the motion detection labeled video image training data is identified via Motion Picture Expert's Group (MPEG) processing techniques.

10. The method of claim 1 wherein the previously stored image pixels comprise reference images without extraneous image pixels captured during the video conference.

11. The method of claim 1 wherein the previously stored image pixels comprise reference images without extraneous image pixels captured prior to the video conference.

12. The method of claim 1 wherein the previously stored image pixels comprise reference images and further comprising:
comparing the received images having extraneous image pixels to the reference images;
identifying for each received image, a closest reference image; and
identifying the replacement image pixels from such closest reference images.

13. The method of claim 1 and further comprising receiving a user-initiated replacement signal that triggers replacing the image pixels with replacement image pixels until a stop replacement signal is received.

14. The method of claim 1 wherein the previously stored image pixels comprise reference images and further comprising suspending replacing the extraneous image pixels with replacement image pixels by transitioning between a reference video and a live video.

15. The method of claim 14 wherein transitioning is performed using a generator network.

16. A machine-readable storage device having instructions for execution by a processor of a machine to cause the processor to perform operations to perform a method, the operations comprising:
receiving images of a user from a device camera during a video conference;
processing the received images via a machine learning model trained on motion detection labeled video image training data to detect extraneous image portions capturing extraneous motions of the user;
identifying extraneous image pixels associated with the extraneous image portions capturing extraneous motions of the user; and
replacing the extraneous image pixels with replacement image pixels of the user from previously stored image pixels that do not contain extraneous image portions to form modified images.

17. The device of claim 16 and further comprising transmitting the modified images to other devices on the video conference.

18. The device of claim 16 wherein the machine learning model is trained on video images labeled as including extraneous image portions comprising unnecessary arm motion or eating activities of the user.

19. The device of claim 16 and further comprising:
receiving audio from the video conference;
detecting that the user of the device is being addressed by processing the received audio via a natural language model trained to recognize a name of the user, and
alerting the user to discontinue activity resulting in extraneous image portions.

20. A device comprising:
a processor; and
a memory device coupled to the processor and having a program stored thereon for execution by the processor to perform operations comprising:
receiving images of a user from a device camera during a video conference;
processing the received images via a machine learning model trained on motion detection labeled video image training data to detect extraneous image portions capturing extraneous motions of the user;
identifying extraneous image pixels associated with the extraneous image portions of the user; and
replacing the extraneous image pixels with replacement image pixels of the user from previously stored image pixels that do not contain extraneous image portions to form modified images.

* * * * *